L. B. Pitcher,
Governor.
N° 5,392.    Patented Dec. 11, 1847.
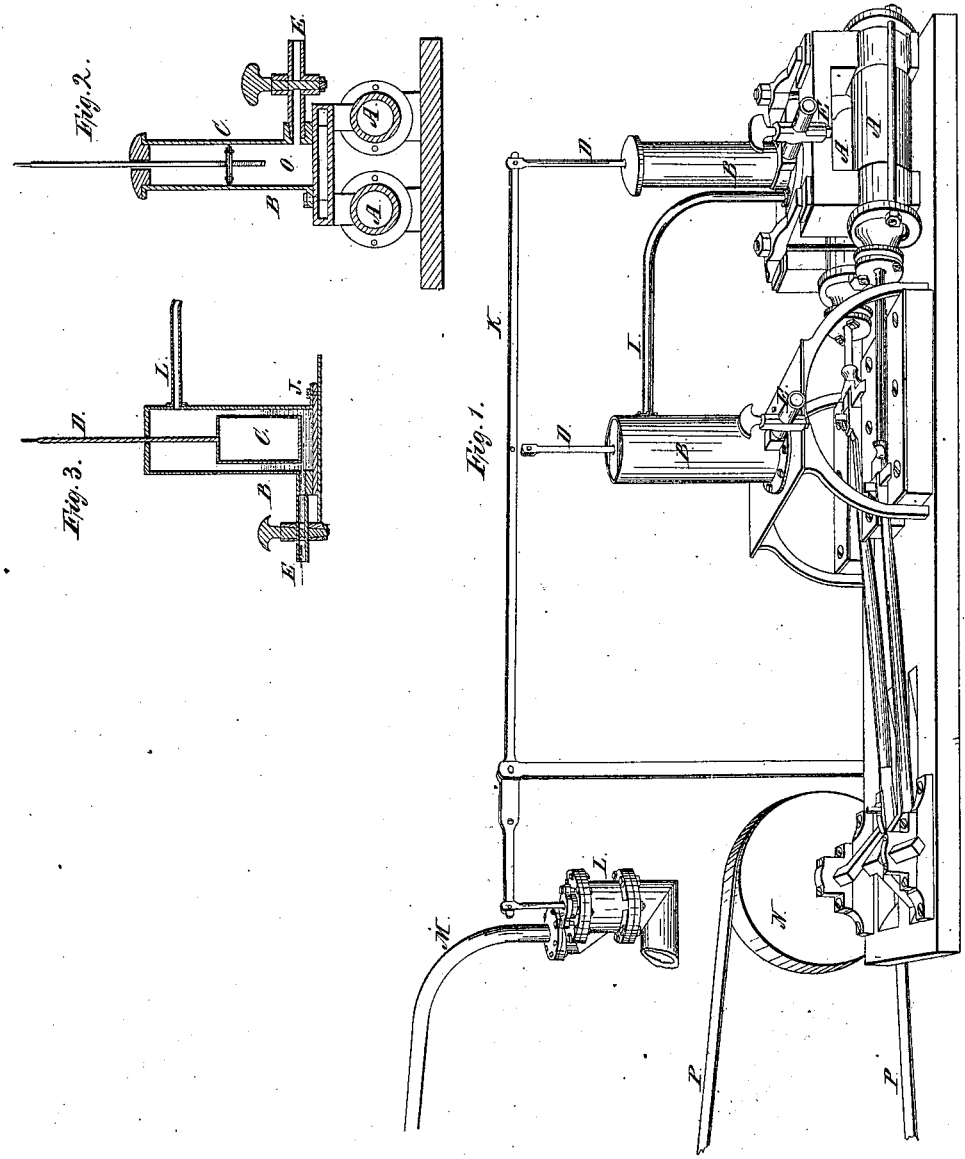

UNITED STATES PATENT OFFICE.

LEMAN BAKER PITCHER, OF SYRACUSE, NEW YORK.

REGULATOR FOR MACHINERY.

Specification of Letters Patent No. 5,392, dated December 11, 1847.

*To all whom it may concern:*

Be it known that I, LEMAN BAKER PITCHER, of Syracuse, in the county of Onondaga and State of New York, have invented a new and useful Machine for the Purpose of Regulating the Motion of Machinery, which machine I call a "Motion-Regulator."

The use and object of this machine, is not to regulate or equalize the motion of machinery by means of a fly wheel, or a balance wheel, or by means of any other manner of equalizing motion which receives or holds in store part of the force or momentum given to a moving body at one point or time, to be given out or expended at another point or time. But the use and object of this machine, is to regulate the motion of machinery to a given motion or number of revolutions per minute, by increasing or diminishing the quantity of steam, water or compressed air going to or acting on an engine or water wheel, so as to give and retain a uniform number of motions or revolutions to a steam engine or water wheel per minute; and consequently to the machinery moved by a steam engine or water wheel.

This machine acts on the steam cock or throttle valve governing the passage of steam from the steam boiler to the steam engine, or on the water gate governing the passage of water to the water wheel, in such a manner as to partially close or open said steam cock, or throttle valve or water gate, so as to reduce or increase the quantity of steam or water, going to or acting on said steam engine or water wheel so as to reduce or increase or continue the motion of the steam engine or water wheel and cause them to move or run at a given speed or number of revolutions per minute. It being understood, that a steam engine or water wheel, will move faster or slower, according as, the amount of steam or water moving them, is increased or decreased.

Again, the use and object of this machine is to change or vary or retain the relative position or connection of machinery moved by wind, horse or other motive power so as to give or obtain regular motion to machinery moved by said wind horse or other motive power, as follows. Not by regulating the motion or number of revolutions of a wind wheel or of a horse power to a given number of revolutions per minute, but by changing, varying or retaining the relative position or connection of machinery, connected to and moved by said wind wheel or horse power so as to give or obtain uniform motion to machinery moved by or receiving motion from said wind wheel or horse power or other unregulated power, it being understood that a wind wheel or horse power is not regulated to make a given number of revolutions per minute, but allowed to move faster or slower as it may be propelled.

My object is to obtain or deduct regular motion from a wind wheel or horse power or other unregulated power by means of varying the relative position or connection of machinery, to such unregulated power.

One means of obtaining regular motion from a wind wheel or other unregulated power, is to attach and move a cone drum by the wind wheel, and attach another cone drum to the machinery to be regulated, the large end of one cone drum being opposite the small end of the other cone drum, and by means of a strap or belt passing over and around both, motion is conveyed or given from one cone drum to the other, and by means of the piston rod of my machine, said belt may be moved to and fro or backward and forward on said drums, so as to vary the relative connection of the said drums, and give regular motion to the machinery to be regulated, by which means to obtain regular motion from a wind wheel or horse power or other power.

Another object of this machine is, to disconnect wagons, cars, or other machinery from the motive or moving power, when moved at too great a speed or motion, by means of the piston rod of my machine.

Another object of this machine is, to check or retard the motion or speed of wagons, cars or machinery by means of brakes or otherwise, moved by the piston rod of this machine.

This machine herein described must be worked or operated by the machine or machinery, wagon, car or gearing sought to be regulated.

Having stated some of the objects of this machine, I do hereby declare that the following is a full, clear and exact description of its construction, and operation of the same, reference being had to the annexed drawings, making a part of this specification, in which—

Figure 1 is a perspective view, Fig. 2 is a cross section view of the air or fluid chamber with a piston head and rod therein, Fig. 3 is a cross section view of a reservoir with a float therein and rod thereto attached.

Letters A, B, C, &c., occurring in this description refer to like letters in the drawings to show the part mentioned.

I construct two double acting force pumps, A, A, made in any known forms, it is not necessary that there should be two pumps or that they should be double acting or force pumps, any kind of pumps may be used which will move more or less fluid according to the increased or decreased motion of them, said pumps A A are to be attached to and worked by the machine or machinery car or gearing, which it is designed to regulate, the air, O. Water or other fluids moved by said pumps A A to be conducted from said pumps A A into an air or fluid chamber B at or near its bottom, said chamber B may be made in any convenient form or size. In said chamber B a plunge or piston head C with a piston rod D attached thereto and extending outwardly, is to be placed, properly adjusted and made movable up and down or out and in. The piston rod D, is attached to the arm or lever K or otherwise of a steam cock or throttle valve L or water gate, in such a manner as to open or close the steam cock or throttle valve L governing the steam in its passage M to a steam engine or to open or close a water gate governing the water in its passage to a water wheel, by the rising or falling of said piston rod D, so as to vary the supply of steam acting on an engine or the supply of water acting on a water wheel, so as to increase or reduce the motion of an engine or water wheel and cause them to run or move at a given or derived motion or velocity per minute. In said chamber B, an escape cock E is inserted through which a given quantity of fluid may escape per minute from said chamber B.

Another mode of constructing this machine is this, a pump or pumps A A moved or worked by the machine or machinery wagon, car or gearing designed to be regulated is made to move water or other liquids into a cylinder or reservoir B having an escape cock E thereinto inserted through which a given quantity of liquid may escape per minute. In said reservoir B a float C made in the form of a hollow cylinder with one or both ends closed so that it will float, or made in any other convenient form or shape adapted to the cylinder or reservoir B, is placed and so adjusted that it will rise or fall in said reservoir B according to the quantity of liquid in or pumped into said reservoir B. Said float C floats in or on the liquid, in said reservoir B and falls or rises as the liquid in said reservoir B rises or falls. To said float C a rod or piston rod D is attached to rise or fall as the float C, rises or falls. Said piston rod D acts on and operates or moves the arm or lever K in such a manner as to open or close the steam cock or throttle valve L or in such a manner as to open or close a water gate in such a manner as to vary or adjust the quantity of steam or water acting on a steam engine or water wheel.

My machine operates as follows. When the machine, or machinery, wagon, car or gearing designed to be regulated, moves at the desired velocity or motion per minute, said pumps A A will move so much and no more air, water or other fluid into said chamber B or reservoir B than can escape through said escape cock E, if said escape cock E is properly adjusted, and said piston head C and rod D or float C and rod D will remain unaltered or unmoved, and hold the arm or lever K, acting on the throttle valve L or on a water gate, in such a position or manner as to continue the flow or volume of steam or water acting on an engine or water wheel and producing the desired motion. Or said rod D or piston rod D will be held unaltered or unmoved and hold a belt, acting over cone drums at or in that point or position which will give and continue the desired motion of the machinery to be regulated by continuing the relative position and connection of such machinery to the propelling power. But when the machine or machinery, wagon, car or gearing designed to be regulated shall or does move faster or slower than the desired motion, more or less fluid will be pumped into cylinder B or reservoir B than will or could escape through said escape cock E, and cause or allow said piston head C and rod D, or float C and rod D to rise or fall, and by its attachment to arm or lever K and valve L or to a water gate, cause said valve L or water gate to partially close or open, so as to reduce or increase the quantity of steam or water going to and acting on said engine or water wheel so as to reduce or increase or restore the motion of said engine or water wheel to the desired motion per minute. Or cause said rod D to move said belt on said cone drum so as to adjust and restore the relative connection or position of gearing or otherwise vary the connection or position of gearing, so as to give, obtain or restore the desired motion. Or cause said rod D to move a brake against the wheel of wagons or cars or gearing, or do other things contemplated to be done for the purposes already set forth under the head of the uses and objects of this machine.

The use, and object and operation, of the escape cock E, attached to the cylinder B and reservoir B is to govern and control the amount of fluid escaping from said cylinder or fluid chamber B or reservoir B through said escape cock E to a given quantity per minute, for by determining and establishing the amount of fluid to be allowed to escape through said escape cock E per minute, the attendant does determine and establish the motion and fix the speed of the machinery sought to be regulated. For if the escapement be large or small through said escape cock E it will require more or less motion of said pumps A A to supply it, and consequently more or less motion to the machinery moving said pumps A A. Therefore by enlarging or lessening the escapement or the escape hole in the escape cock E this machine can be set, to regulate the motion of machinery designed to be regulated, to run or move at any desired motion or velocity per minute, or to disconnect wagons, cars or gearing or to check or retard their motion, by brakes or otherwise at any point of motion or speed or velocity that may be desired as hereinbefore explained. The amount of escapement of fluid being fixed, any surplus or wastage of fluid moved, causes the piston head C and float C to rise or fall and do and perform as described for the purposes described.

Fluids may be pumped out of said chamber B or reservoir B and so act on the piston head C or float C as to produce all the objects and purposes, described, hereinbefore. The escape cock E acting as a supply cock. Fluids or shot, sand or other small substances may be moved, in any known manner, by the machinery designed to be regulated into a vessel or reservoir made capable of rising or falling according to the supply moved therein and be made to regulate motion or do other things herein before described as being done, by the rising and falling of said vessel. Said vessel having an escape cock attached to perform all the uses already spoken of as being done by it.

Letter N in Fig. 1 of the accompanying drawings, shows a band wheel or pulley receiving motion, by means of a belt P P from the machinery designed to be regulated which moves the pump A A. The pumping or moving of air, water or other fluids, or of moving shot, sand or other small substances, by the machine, machinery, car, wagon or gearing designed to be regulated to a given motion per minute, or to be otherwise acted upon or moved, as a means of regulating motion and doing other things set forth to be done, is an important feature of this invention.

The use of the escape cock, as a means of setting this machine, to regulate the motion of machinery to a given motion, in the manner herein before set forth, and to do other things contemplated to be done, and herein before set forth, is an important feature of this invention.

It is evident that air, water or other fluids, shot, sand or other substances may be moved by other pumps or means, connected to and propelled by the machinery or part to be regulated or acted upon, other than that set forth and shown. And that other forms of cylinder reservoir, piston head, floats and other parts may be made, and that other ways and means of connecting the parts before described, may be had, other than that already set forth and described. And therefore I do not confine myself to the exact form or combinations of parts herein before set forth and shown in the accompanying drawings. But intend to vary or alter the size, form, number or position of pumps, or substitute other means of moving fluids or substances by the machinery to be regulated or part to be acted upon, as circumstances may require. Or to vary the size, form or position of the air or fluid chamber B or reservoir B or of any other part or piece of this machine as circumstances may require. While I maintain an analogous combination or combinations and adhere strictly to the principles embraced in this machine and invention.

Thus having fully described the principles and application of my invention, I wish it distinctly understood that I do not claim the several modes described herein of applying the principles, but What I do claim and desire to secure by Letters Patent of the United States is—

The combination of the pump or pumps A A, chamber B piston or float C, rod D, escape cock E, or any analogous arrangement, with the machinery to be regulated or with the power by which such machinery is driven, for the purpose of regulating said power or the motion of the machinery, substantially in the manner and for the purposes herein before set forth.

LEMAN BAKER PITCHER.

Witnesses:
 BYRON FORD,
 CHAS. FORD.